March 29, 1927.
P. KIRK ET AL
1,622,724
PINCE-NEZ AND SPECTACLES
Filed Feb. 5, 1926
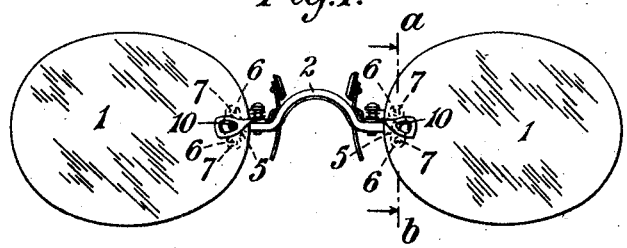
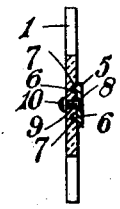
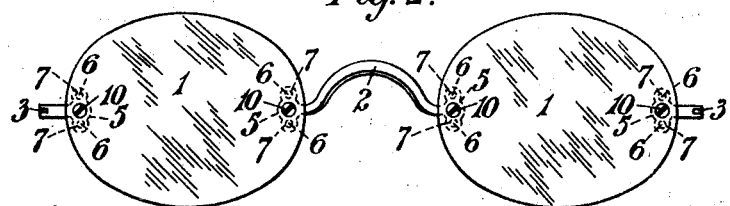
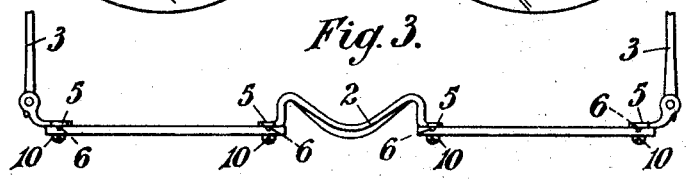
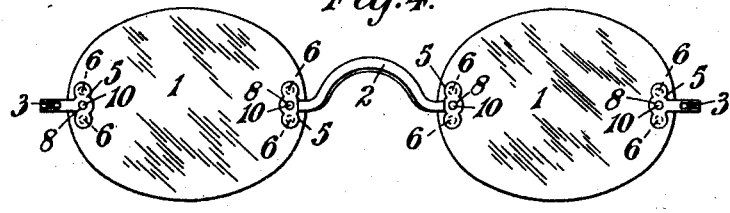
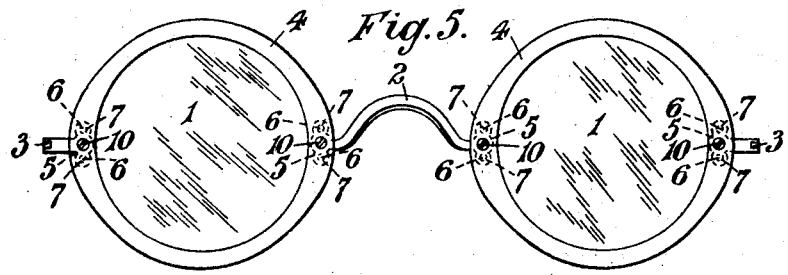
Inventors
Percy Kirk
Sidney Mortimer Kirk
BY Rugg, Boyce & Bakelur
ATTORNEYS.

Patented Mar. 29, 1927.

1,622,724

UNITED STATES PATENT OFFICE.

PERCY KIRK AND SIDNEY MORTIMER KIRK, OF LONDON, ENGLAND.

PINCE-NEZ AND SPECTACLES.

Application filed February 5, 1926, Serial No. 86,110, and in Great Britain March 12, 1925.

The invention relates to pince-nez and spectacles and consists of improved mounts for connecting the bridges of rimless pince-nez and the bridges and sides of rimless spectacles to the lenses of the pince-nez and spectacles, and for connecting the bridges, when formed of metal, and the sides of tortoise-shell and like spectacles to the rims or eye-frames of the spectacles.

The improved mounts consist of metal plates of elongated shape which are provided at suitable distances from their ends with projecting studs of lesser length than the thickness of the lenses or the thickness of the rims or eye-frames to which they are to be secured and are provided at their centres with tapped holes. The lenses or rims or eye-frames are formed with recesses corresponding to the projecting studs on the mounts or plates and with holes adapted to receive screws which engage with the tapped holes provided in the centres of the mounts or plates and secure the latter to the lenses or the rims or eye-frames. Said recesses are formed on lines which are disposed at right angles to horizontal lines passing through the centres of the lenses or rims or eye-frames.

The present invention is illustrated by the accompanying drawings.

Fig. 1 is a front view of a rimless pince-nez, the bridge of which is secured to the lenses by means of the improved mounts. Figs. 2, 3 and 4 are respectively a front view, a plan and a rear view of a pair of rimless spectacles, the bridge and sides of which are secured to the lenses by means of the improved mounts. Fig. 5 is a front view of a pair of tortoise-shell or like spectacles, in which the bridge, formed of metal, and the sides of the spectacles are secured to the rims or eye-frames by means of the improved mounts. Fig. 6 is a section, taken on the line a—b of Fig. 1, showing more clearly the projecting studs on the mounts, the recesses for said studs, and the screws by which the mounts are secured in place.

Referring now to these drawings, 1 are the lenses of the pince-nez or the spectacles, 2 are the bridges of the pince-nez or spectacles, 3 are the sides of the spectacles, and 4 are the rims or eye-frames of the pair of tortoise-shell or like spectacles. 5 are the improved mounts, consisting of metal plates of elongated shape which are formed in one with or are secured to the bridge 2 of the pince-nez, Fig. 1, or to the bridge 2 of the spectacles, Figs. 2-5. 6 are the studs projecting from the mounts or plates 5 and made of lesser length than the thicknesses of the lenses 1 or of lesser length than the thickness of the tortoise-shell or like rims or eye-frames 4, and 7 are the recesses formed in the lenses 1 and in the rims or eye-frames 4 for receiving the studs 6 on the mounts or plates 5. 8 are the tapped holes formed in the centres of the mounts or plates. 9, Fig. 6, indicates one of the holes formed in the lenses 1 or in the rims or eye-frames 4 for the passage of screws 10 which engage with the tapped holes 8 in the mounts 5.

As will be understood from the foregoing description the improved mounts can also be used for connecting sides to the rims or eye-frames of tortoise-shell or like spectacles which are provided with bridges of the same material as the rims or eye-frames, and can also be used for securing the bridges of tortoise-shell or like pince-nez to the rims or eye-frames of the pince-nez.

The improved mount possesses many advantages.

For instance in the case of rimless pince-nez and rimless spectacles provided with the improved mount the lenses will not be likely to become broken if the pince-nez or spectacles should fall on a floor or the like, while the weakening of concave lenses, due to the necessity of grinding away parts of the lenses to receive ordinary mounts, will be avoided. Also the lenses will not work loose, as in the case of ordinary mounts, while if they should work loose the mounts can be easily tightened without any risk of the lenses being broken. Other advantages of the improved mount in the case of rimless pince-nez and spectacles are that there will be but little risk of the lenses becoming broken during fitting, while the same mounts may be used with any thickness of lenses, longer or shorter screws being the only change that is necessary with different thicknesses of lenses. As regards the advantages of the improved mount when used with tortoise-shell or like pince-nez and spectacles the improved mounts will be more firmly secured to the tortoise-shell or like rims or eye-frames than in the case of ordinary mounts, owing to there being three points of connection in the case of each mount, and the rims or eye-frames will not be weakened to the same extent as is the case with ordinary mounts which entail the drilling of two through holes for each mount, the presence of which often leads to splitting of the tortoise-shell or other material of the rims or eye-frames. Again the disadvantage attendant on the use of rivets for securing ordinary mounts to tortoise-shell or like rims or eyeframes, namely the working loose of the rivets owing to the expansion of said material on considerable rises of temperature, is entirely avoided. In the case of the improved mounts the screws by which they are secured in position can in such circumstances be readily tightened without risk of splitting the material.

The mounts, though preferably secured to the rear surfaces of the lenses and rims or eye-frames of pince-nez and spectacles, as illustrated by the drawings, may be secured to the front surfaces of these parts.

Having now described our invention what we have invented and desire to secure by Letters Patent of the United States is as follows:—

A device of the character described, comprising in combination, a pair of lenses, metal fittings therefor, an elongated metal plate carried by each fitting and offset therefrom at that end thereof which is to be connected to another member, said member having an opening therethrough and a pair of depressions of less depth than the thickness of the member and disposed in alinement with said opening, said plate having a threaded opening adapted to register with the opening in said member and a pair of projections adapted to be seated in said depressions, and a screw passing through the opening in said member and engaging the threaded opening in said plate, the organization being such that when the device is assembled the major axis of said plate extends at right angles to a line passing transversely across the lenses at the center line thereof.

In testimony whereof we have signed our names to this specification.

PERCY KIRK.
SIDNEY MORTIMER KIRK.